(12) United States Patent
Avery et al.

(10) Patent No.: US 10,599,140 B2
(45) Date of Patent: Mar. 24, 2020

(54) SYSTEM AND METHOD FOR MITIGATION OF ANOMALOUS DATA IN A CONNECTED VEHICLE SYSTEM

(71) Applicant: General Motors LLC, Detroit, MI (US)

(72) Inventors: Paul A. Avery, Round Rock, TX (US); David H. Clifford, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 128 days.

(21) Appl. No.: 15/902,342

(22) Filed: Feb. 22, 2018

(65) Prior Publication Data

US 2019/0258242 A1  Aug. 22, 2019

(51) Int. Cl.
| | |
|---|---|
| *G06K 9/00* | (2006.01) |
| *G05D 1/00* | (2006.01) |
| *H04N 7/18* | (2006.01) |
| *G06K 9/62* | (2006.01) |
| *G05D 1/02* | (2020.01) |

(52) U.S. Cl.
CPC ........... *G05D 1/0027* (2013.01); *G05D 1/024* (2013.01); *G06K 9/00791* (2013.01); *G06K 9/00979* (2013.01); *G06K 9/6201* (2013.01); *G06K 9/6289* (2013.01); *H04N 7/181* (2013.01); *G05D 1/0022* (2013.01); *G05D 1/0248* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0224294 A1* | 10/2006 | Kawazoe | ............ | B60W 30/143 701/93 |
| 2010/0292886 A1* | 11/2010 | Szczerba | ............ | G01C 21/365 701/31.4 |

(Continued)

FOREIGN PATENT DOCUMENTS

WO  WO-2017180382 A1  10/2017

OTHER PUBLICATIONS

Paul a. Avery et al.; U.S. Appl. No. 15/902,406, filed Feb. 22, 2018 entitled "System and Method for Managing Trust Using Distributed Ledgers in a Connected Vehicle Network"; 49 pages.

(Continued)

*Primary Examiner* — Alex Kok S Liew

(57) ABSTRACT

At least one transceiver is configured to wirelessly receive data from a source node that is external to a vehicle, the data including a unique identifier (ID) of the source node and at least one of: a first location of the source node; a first heading of the source node; a first speed of the source node; and a first object type of the source node. At least one of a camera and a sensor is configured to identify objects located around the vehicle. An anomaly module is configured to selectively indicate that an anomaly is present in the data. A distributed ledger includes a list of unique IDs associated with not-trusted source nodes. A ledger management module is configured to, in response to an indication that an anomaly is present in the data received from the source node, add the unique ID of the source node to the list.

18 Claims, 5 Drawing Sheets

(56) References Cited

U.S. PATENT DOCUMENTS

2015/0318996 A1* 11/2015 van Roermund ....... H04L 9/006
                                                    713/158
2019/0188901 A1* 6/2019 Herman ............... H04N 13/275

OTHER PUBLICATIONS

U.S. Appl. No. 16/006,371, Avery et al.
Paul A. Avery et al.; U.S. Appl. No. 16/006,371, filed Jun. 12, 2018 entitled "Method and System for Distributed Ledger Technology Communications for Vehicles"; 29 pages.

* cited by examiner

SYSTEM AND METHOD FOR MITIGATION OF ANOMALOUS DATA IN A CONNECTED VEHICLE SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to connected vehicle networks and more particularly to connected vehicle networks utilizing distributed ledgers.

A vehicle may include a transceiver that wirelessly communicates with a network of other nodes, such as other vehicles and infrastructure nodes. Wireless communication between vehicles is used in vehicle to vehicle (V2V) networks. Wireless communication between vehicles may be used, for example, to control individual movement of vehicles and to control movement of vehicles as a group.

Wireless communication between vehicles and infrastructure nodes is used in vehicle to infrastructure (V2I) networks. Wireless communication between vehicles and infrastructure nodes may be used, for example, to control vehicle movement and to control traffic flow by traffic systems. Vehicle to everything (V2X) networks involve communication between vehicles and various types of devices, such as vehicles, pedestrian based devices, cyclist based devices, infrastructure based devices, energy distribution grid based devices, traffic system based devices, and other types of devices.

SUMMARY

In a feature, a distributed ledger system of a vehicle includes at least one transceiver configured to wirelessly receive data from a source node that is external to the vehicle, the data including a unique identifier (ID) of the source node and at least one of: a first location of the source node; a first heading of the source node; a first speed of the source node; and a first object type of the source node. At least one of a camera and a sensor is configured to identify objects located around the vehicle. An anomaly module is configured to selectively indicate that an anomaly is present in the data received from the source based on at least one of: a comparison of the first location of the source node with input from the at least one of the camera and the sensor; a comparison of the first heading of the source node with input from the at least one of the camera and the sensor; a comparison of the first speed of the source node with input from the at least one of the camera and the sensor; and a comparison of the first object type of the source node with input from the at least one of the camera and the sensor. A distributed ledger includes a first list of unique IDs associated with trusted source nodes and a second list of unique IDs associated with not-trusted source nodes. A ledger management module is configured to, in response to an indication that an anomaly is present in the data received from the source node, add the unique ID of the source node to the second list of unique IDs associated with not trusted source nodes stored in the distributed ledger.

In further features: the data received from the source node includes the first location of the source node; and the anomaly module is configured to indicate that an anomaly is present in the data received from the source node when the at least one of the camera and the sensor do not identify the presence of an object within a predetermined distance of the first location of the source node.

In further features: the data received from the source node further includes the first heading of the source node; and the anomaly module is configured to indicate that an anomaly is present in the data received from the source node when the at least one of the camera and the sensor identify: an object at approximately the first location; and the object has a second heading that is different than the first heading of the source node.

In further features: the data received from the source node further includes the first speed of the source node; and the anomaly module is configured to indicate that an anomaly is present in the data received from the source node when the at least one of the camera and the sensor identify: an object at approximately the first location; and the object has a second speed that is different than the first speed of the source node.

In further features: the data received from the source node further includes the first object type of the source node; and the anomaly module is configured to indicate that an anomaly is present in the data received from the source node when the at least one of the camera and the sensor identify: an object at approximately the first location; and the object is a second type of object that is different than the first object type of the source node.

In further features: the at least one of the camera and the sensor include: at least one camera having a field of view outside of the vehicle; and at least one light detection and ranging (LIDAR) sensor.

In further features: the at least one transceiver is configured to, in response to an indication of an anomaly in the data received from the source node, wirelessly transmit the data received from the source node to the trusted source nodes of a connected vehicle network for execution of a consensus algorithm; and the ledger management module is configured to, in response to a determination that the data received from the source node includes an anomaly via execution of the consensus algorithm, add the unique ID of the source node to the second list of unique IDs associated with not trusted source nodes stored in the distributed ledger.

In further features a driving control module is configured to, in response to a determination that the unique ID of the source node is in the second list of unique IDs associated with not-trusted source nodes, control movement of the vehicle independently of the data from the source node.

In further features a driving control module is configured to, in response to a determination that the unique ID of the source node is within the first list of unique IDs associated with trusted source nodes stored in the distributed ledger, selectively adjust steering of the vehicle based on the data received from the source node.

In further features a driving control module is configured to, in response to a determination that the unique ID of the source node is within the first list of unique IDs associated with trusted source nodes stored in the distributed ledger, selectively decelerate the vehicle based on the data received from the source node.

In further features a driving control module is configured to, in response to a determination that the unique ID of the source node is within the first list of unique IDs associated with trusted source nodes stored in the distributed ledger, selectively accelerate the vehicle based on the data received from the source node.

In further features a driving control module is configured to, in response to a determination that the unique ID of the source node is within the first list of unique IDs associated with trusted source nodes stored in the distributed ledger, selectively apply brakes of the vehicle based on the data received from the source node.

In further features a driving control module is configured to, in response to a determination that the unique ID of the source node is within the first list of unique IDs associated with trusted source nodes stored in the distributed ledger, selectively one of increase and decrease torque output of an internal combustion engine the vehicle based on the data received from the source node.

In further features a driving control module is configured to, in response to a determination that the unique ID of the source node is within the first list of unique IDs associated with trusted source nodes stored in the distributed ledger, selectively one of increase and decrease torque output of an electric motor of the vehicle based on the data received from the source node.

In further features the source node is one of: a second vehicle; an infrastructure node; and a traffic system node.

In further features, the at least one transceiver is configured to, in response to a determination to that the unique ID of the source node is within the second list of not trusted source nodes, discard the data received from the source node.

In further features a system includes: the distributed ledger system of the vehicle; and a second vehicle comprising: a second distributed ledger including a third list of unique IDs associated with trusted source nodes and a fourth list of unique IDs associated with not-trusted source nodes; and a second ledger management module configured to, in response to an indication that an anomaly is present in the data received from the source node, add the unique ID of the source node to the fourth list of unique IDs associated with not trusted source nodes stored in the second distributed ledger.

In a feature, a method for a vehicle includes: by at least one transceiver, wirelessly receiving data from a source node that is external to the vehicle, the data including a unique identifier (ID) of the source node and at least one of: a first location of the source node; a first heading of the source node; a first speed of the source node; and a first object type of the source node; by at least one of a camera and a sensor, identifying objects located around the vehicle; selectively indicating that an anomaly is present in the data received from the source based on at least one of: a comparison of the first location of the source node with input from the at least one of the camera and the sensor; a comparison of the first heading of the source node with input from the at least one of the camera and the sensor; a comparison of the first speed of the source node with input from the at least one of the camera and the sensor; and a comparison of the first object type of the source node with input from the at least one of the camera and the sensor; managing a distributed ledger including a first list of unique IDs associated with trusted source nodes and a second list of unique IDs associated with not-trusted source nodes; and in response to an indication that an anomaly is present in the data received from the source node, adding the unique ID of the source node to the second list of unique IDs associated with not trusted source nodes stored in the distributed ledger.

In further features: the data received from the source node includes the first location of the source node; and selectively indicating that an anomaly is present includes indicating that an anomaly is present in the data received from the source node when the at least one of the camera and the sensor do not identify the presence of an object within a predetermined distance of the first location of the source node.

In further features the method further includes: in response to an indication of an anomaly in the data received from the source node, wirelessly transmitting the data received from the source node to the trusted source nodes of a connected vehicle network for execution of a consensus algorithm; and in response to a determination that the data received from the source node includes an anomaly via execution of the consensus algorithm, adding the unique ID of the source node to the second list of unique IDs associated with not trusted source nodes stored in the distributed ledger.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
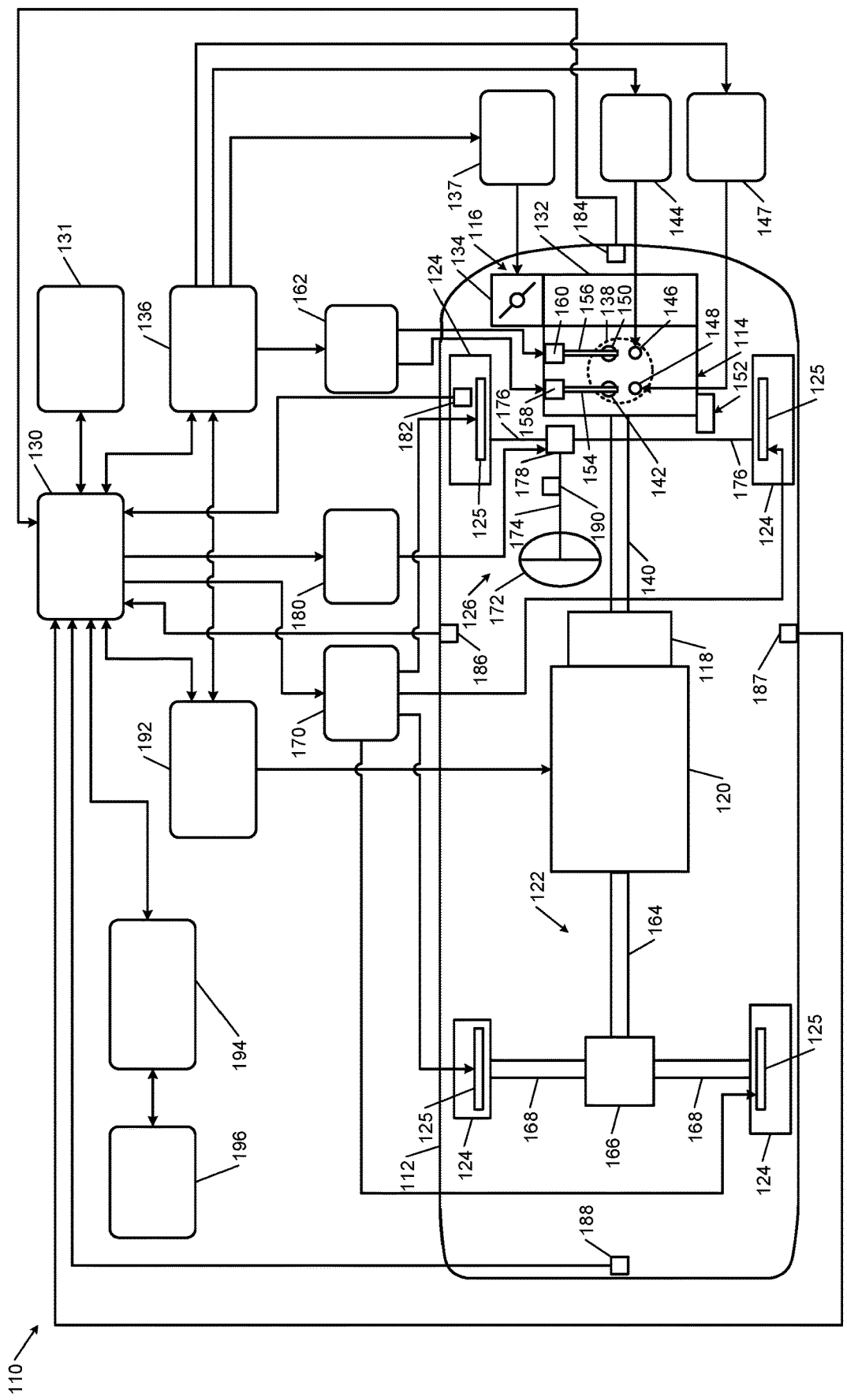
FIG. 1 includes a functional block diagram of an example vehicle system.

Vehicles communicate with other devices in connected vehicle networks, such as vehicle to vehicle (V2V) networks, vehicle to infrastructure networks (V2I) networks, vehicle to pedestrian (V2P) networks, and vehicle to everything (V2X) networks. Nodes of a connected vehicle network may broadcast, for example, their respective unique identifier, their respective present locations, their respective present speed, their respective present headings, and other data.

The data from the nodes can be used by other nodes, for example, to control vehicle movement individually or as a group, control traffic signals, and for other reasons. Utilizing data from not trusted nodes, however, may cause a node to act unnecessarily.

One central authority could be utilized to determine whether to trust a node or not. For example, when a first node receives data from a second node, the first node could determine whether to trust the second node via conferring with the central authority. Corruption of the central authority, however, may lead to not trustworthy nodes being trusted.

According to the present disclosure, a distributed ledger (or blockchain) based system is used for trusting nodes. When a first node receives data from a second node, the first node determines whether the unique identifier of the second node is included within the distributed ledger. If the unique identifier of the second node is not in the distributed ledger, the connected vehicle network collectively determines whether to trust the second node via execution of a consensus algorithm. If the connected vehicle network collectively determines to trust the second node, the distributed ledger of each node is updated to reflect that the second node is to be trusted.

Trusted and not trusted nodes, however, may sometimes output anomalous data under some circumstances. Utilizing anomalous data may cause a node to act unnecessarily.

Anomalies in received data can be identified by the nodes. For example, a vehicle includes one or more cameras and/or sensors that identify characteristics (e.g., location, speed, heading) of objects located around the vehicle. The vehicle may recognize the presence of an anomaly when another node provides data that is not supported by the data from the one or more cameras and/or sensors of the vehicle. For example, the vehicle may recognize the presence of an anomaly when the other node provides its location and the one or more cameras and/or sensors of the vehicle do not detect the presence of an object at that location. As another example, the vehicle may recognize the presence of an anomaly when the other node that it is a building at a location and the one or more cameras and/or sensors of the vehicle detect the presence of an automobile at that location.

When an anomaly is detected, the connected vehicle network collectively determines whether the data (or the source) includes an anomaly via execution of a consensus algorithm. If the connected vehicle network collectively determines that the data or the source includes an anomaly, the distributed ledger of each node is updated to reflect that the second node includes an anomaly or is to not be trusted.

The distributed ledger system may improve security of the connected vehicle network.

FIG. 1 includes a functional block diagram of an example vehicle system. A vehicle 110 includes a vehicle body 112, an engine 114, an intake system 116, a torque converter 118, a transmission 120, a driveline 122, wheels 124, mechanical (friction) brakes 125, and a steering system 126. The vehicle 110 may be autonomous, semi-autonomous, or non-autonomous. The vehicle 110 may be a shared vehicle (e.g., part of a ride sharing system) or a non-shared vehicle.

The engine 114 combusts an air/fuel mixture to produce drive torque for the vehicle 110. The amount of torque input to the transmission 120 is controlled based on a driver input and/or a first input from a driving control module (DCM) 130. The driver input may be a signal indicating a position of an accelerator pedal. The first input from the DCM 130 may be a target vehicle acceleration.

The DCM 130 may adjust the target vehicle acceleration, for example, to maintain a target vehicle speed, to maintain a predetermined following distance, and/or to prevent contact between the vehicle and one or more objects around the vehicle 110. The DCM 130 may determine the target vehicle speed based on the location of the vehicle 110 and a government speed limit for the road on which the vehicle 110 is travelling. The DCM 130 may determine the speed limit, for example, based on an input received from a global positioning system (GPS) module 131 or by identifying the speed limit posted on a speed limit sign from an image captured using a camera. The GPS module 131 includes a transceiver for communicating with a GPS satellite.

Air is drawn into the engine 114 through the intake system 116. The intake system 116 includes an intake manifold 132 and a throttle valve 134. The throttle valve 134 may include a butterfly valve having a rotatable blade. An engine control module (ECM) 136 controls a throttle actuator module 137, which regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 136 controls a fuel actuator module 144, which regulates fuel injections performed by a fuel injector 146 to achieve a target air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 147 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC).

The spark actuator module 147 may be controlled by a spark timing signal specifying how far before or after TDC to generate the spark. Because piston position is directly related to crankshaft rotation, operation of the spark actuator module 147 may be synchronized with crankshaft angle. In various implementations, the spark actuator module 147 may halt provision of spark to deactivated cylinders. Spark plugs are omitted in some types of engines.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 146, the timing at which spark is generated by the spark plug 148, and/or the timing at which the intake and exhaust valves 142 and 150 are opened to achieve a target torque output of the engine 114. The ECM 136 determines the target engine torque based on the driver input and/or the first input from the DCM 130. The ECM 136 may determine whether to determine the target engine torque based on the driver input or the first input based on a second input from the DCM 130. The DCM 130 may control whether the ECM 136 uses the driver input or the first input to determine the target engine torque based on whether the driver's foot is on the accelerator pedal. The DCM 130 may determine that the driver's foot is on the accelerator pedal when the accelerator pedal position indicates a pedal depression level that is greater than a predetermined amount.

In some vehicles, one or more electric motors may be implemented in addition to the engine 114 or in place of the engine 114. The ECM 136 may control torque output of the one or more electric motors based on the target engine torque.

Torque output by the engine 114 (via the crankshaft 140) and/or one or more electric motors is transferred to the transmission 120, through the driveline 122, and to the wheels 124. The driveline 122 includes a drive shaft 164, a differential 166, and axle shafts 168. The torque converter 118, the transmission 120, and the differential 166 increase or decrease torque by several gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist (slow) rotation of the wheels 124 when the friction brakes 125 are applied. The friction brakes 125 may include drum brakes and/or disc brakes, and may include electrohydraulic actuators and/or electromechanical actuators that press a brake pad against a brake disc and/or drum when the friction brakes 125 are applied.

A brake actuator module 170 applies the friction brakes 125 based on a brake pedal position and/or a signal from the DCM 130. The friction brakes 125 may be independently applied at different levels. The DCM 130 may apply the friction brakes 125, for example, to maintain the target vehicle speed, to maintain the predetermined following distance, and/or to prevent the vehicle from contacting an object.

The steering system 126 selectively turns the front wheels 124, thereby turning the vehicle 110. The steering system 126 includes a steering wheel 172, a steering column 174, one or more steering linkages 176, and a steering actuator 178. A driver may rotate the steering wheel 172 to turn the vehicle 110 left or right or to input a request to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and translates the steering linkages 176, thereby turning the front wheels 124. In various implementations, the steering actuator 178 may be an electrohydraulic and/or electromechanical actuator. In implementations where the steering column 174 is coupled to the steering linkages 176, such as power steering systems, the steering actuator 178 may reduce the amount of effort that the driver must exert to turn the vehicle 110. In various implementations, the steering column 174 may not be coupled to the steering linkages 176, and the steering actuator 178 alone may translate the steering linkages 176. Steering systems where the steering column 174 is not coupled to the steering linkages 176 may be referred to as a steer-by-wire system.

A steering actuator module 180 actuates the steering actuator 178 based on a steering signal from the DCM 130. The DCM 130 may set the steering signal based on the angular position of the steering wheel 172. In various implementations, the DCM 130 may set the steering signal based on one or more other inputs. For example, the DCM 130 may set the steering signal to navigate the vehicle according to a target path. The DCM 130 may set the target path to maintain the vehicle 110 between lane lines under some circumstances, to change lanes, to avoid contacting objects, and/or to navigate the vehicle 110 from its present location to a target location.

One or more wheel speed sensors 182 are mounted to one or more of the wheels 124 and measures the speed of wheels 124, respectively. For example, one wheel speed sensor may be provided for each wheel and measure that wheels wheel speed.

A forward facing camera 184 captures images within a predetermined field of view (FOV) in front of the vehicle 110. The forward facing camera 184 may be located, for example, in a front fascia of the vehicle 110. The forward facing camera 184, however, may be located elsewhere, such as with a rear view mirror inside of a front wind shield of the vehicle or at another suitable location to capture images in front of the vehicle 110.

Side facing cameras 186 and 187 are mounted to the left and right sides of the vehicle body 112 and generate images within predetermined FOVs on the left and right sides of the vehicle 110, respectively. A rear facing camera 188 captures images within a predetermined field of view (FOV) behind the vehicle 110. While the example of forward facing, side facing, and rear facing cameras are shown and described, one or more other cameras may also be included. Also, while the example of forward facing, side facing, and rear facing cameras are shown and described, the vehicle may additionally or alternatively include one or more other types of sensors that analyze and identify objects around the vehicle, such as light detection and ranging (LIDAR) sensors, sonar sensors, radar sensors, and/or one or more other types of sensors.

An accelerometer may be mounted to (e.g., the rear of) the vehicle body 112 and measures the lateral, longitudinal, and/or vertical acceleration of the vehicle 110. The accelerometer may include a triaxial accelerometer, a dual-axis accelerometer, and/or one or more single-axis accelerometers. In one example, the accelerometer is a dual-axis accelerometer that measures the lateral and longitudinal acceleration of the vehicle 110.

A steering wheel angle sensor 190 measures the angular position of the steering wheel 172 relative to a predetermined position. The predetermined position may correspond to a location where the vehicle should (or does) travel straight along a longitudinal axis of the vehicle. The steering wheel angle sensor 190 may be mounted to the steering column 174 and may include, for example, a Hall Effect sensor that measures the angular position of a shaft that is disposed within the steering column 174 and rotatably coupled to the steering wheel 172.

A transmission control module (TCM) 192 shifts gears of the transmission 120 based on operating conditions of the vehicle 110 and a predetermined shift schedule. The operating conditions may include the speed of the vehicle 110, a target acceleration of the vehicle 110, and/or a target torque output of the engine 114. The TCM 192 may determine a vehicle speed based on wheel speeds measured using the wheel speed sensors 182. For example, the TCM 192 may determine the vehicle speed based on an average of the wheel speeds or an average of speeds of undriven (i.e., non-driven) wheels of the vehicle. The TCM 192 may receive the target vehicle acceleration and/or the target engine torque from the DCM 130 and/or the ECM 136. The ECM 136 may communicate with the TCM 192 to coordinate shifting gears in the transmission 120. For example, the ECM 136 may reduce engine torque during a gear shift.

The vehicle 110 also includes a communications module 194 including one or more transceivers that wirelessly receive information from and transmit information via one or more antennas 196 of the vehicle. Examples of transceivers include, for example, cellular transceivers, Bluetooth transceivers, WiFi transceivers, satellite transceivers, and other types of transceivers.

Figure 2:
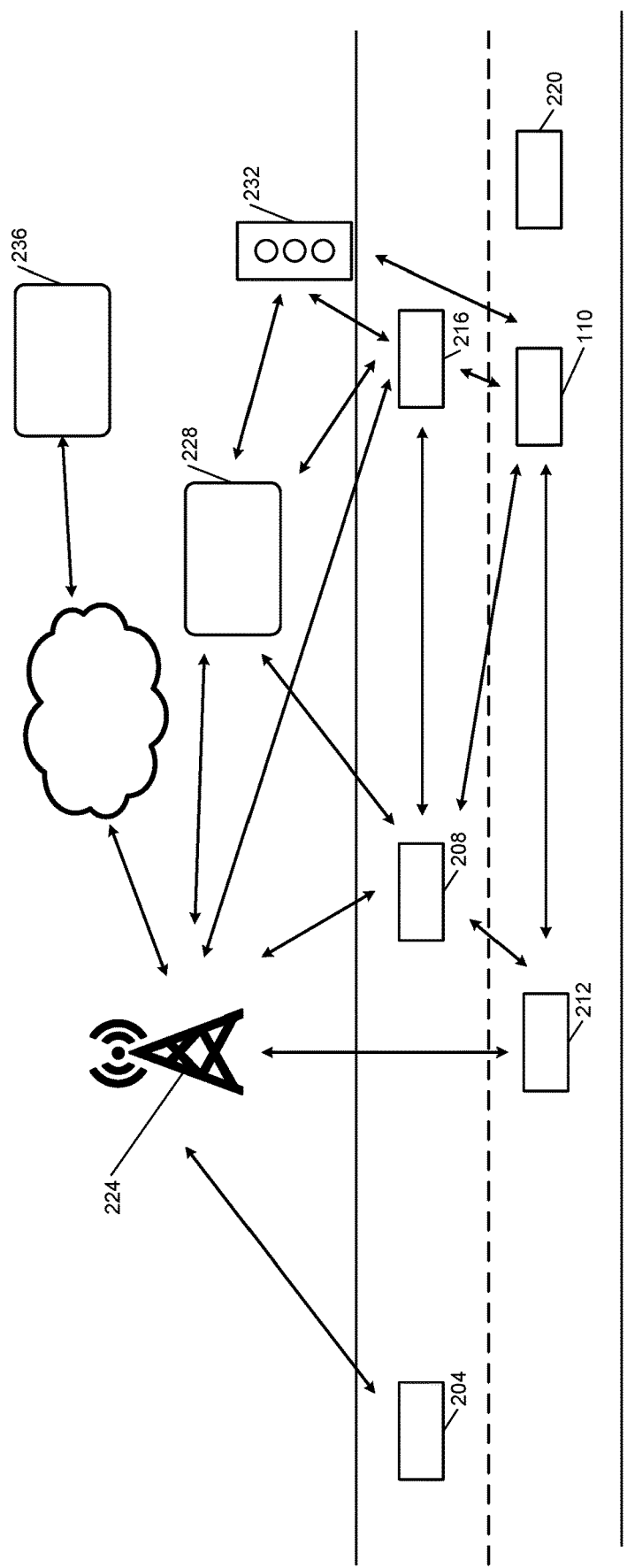
FIG. 2 includes a functional block diagram of a connected vehicle network.

FIG. 2 is an example view including the vehicle 110 and a plurality of other vehicles in a connected vehicle network, such as a vehicle to vehicle (V2V) network, a vehicle to infrastructure (V2I), or a combination V2V and V2I network. Combination V2V and V2I networks are referred to as V2X networks.

The vehicle 110 and a plurality of other nodes, such as other vehicles 204, 208, 212, 216, and 220, infrastructure nodes and other types nodes, such as nodes 224, 228, and 232, wirelessly communicate directly or indirectly. Examples of infrastructure nodes include nodes of traffic systems, nodes of communication systems, nodes of buildings, and nodes at other types of infrastructure. Other types of nodes include, for example, cyclist nodes, pedestrian nodes, etc. One or more servers, such as server 236 may also be connected to the connected vehicle network.

For example, vehicles of the connected vehicle network periodically (e.g., at a predetermined frequency) broadcast their unique identifier, position, speed, and heading. Vehicles of the network may also broadcast other types of data. Infrastructure nodes and other nodes also periodically broadcast their unique identifier and various other data. The positions, speeds, headings, and other data can be used (e.g., by the vehicles themselves, one or more servers, or another controller) to control movement of the vehicles individually and in groups of two or more vehicles. Use of incorrect data and/or data from non-trustworthy sources, however, could cause movement (e.g., unnecessary) of one or more vehicles.

According to the present disclosure, the connected vehicle network determines whether to trust a source of broadcast data using a distributed public ledger. Distributed public ledger technology is sometimes referred to as blockchain.

The connected vehicle network collectively determines and updates a distributed ledger (or database) that includes the unique identifiers of trusted nodes. The distributed ledger (or another distributed ledger) also includes the unique identifiers of non-trusted nodes. The unique identifiers may, for example, be in the form of a cryptographic hash function, such as the Secure Hash Algorithm (SHA) 256 cryptographic hash function.

The distributed ledger is updated by each trusted node for local reference. When a node receives data from a source (e.g., another vehicle or node), the node determines whether the unique identifier included in the received data is trusted in the distributed ledger. If the unique identifier is included as trusted in the distributed ledger, the node may trust the source of the received data and may use and/or broadcast the received data for use by vehicles and/or other nodes of the connected vehicle network.

If the unique identifier is not included within the distributed ledger, the node may broadcast the unique identifier to trusted nodes. The node and the other trusted nodes execute a consensus algorithm to determine whether to trust the source of the received data or not. If a determination is made to trust the source of the received data, the unique identifier of the source is added to the distributed ledger as being trusted so that the connected vehicle network can utilize data received from the source. If a determination is made by the connected vehicle network to not trust the source of the received data, the unique identifier of the source may be added to the distributed ledger as a not-trusted source. Data received from not-trusted sources may be ignored by vehicles and nodes of the connected vehicle network and discarded.

A vehicle can also determine whether a source should be trusted or is providing anomalous data using data from sensors (e.g., LIDAR, radar, sonar, etc.) and/or cameras (e.g., forward, side, or rear facing) of the vehicle that identify objects around the vehicle. The vehicle (or the connected vehicle network) can determine that a source is providing anomalous data (e.g., and not trust the source) when the source provides data that is irreconcilable with data from the cameras and sensors of the vehicle. If a determination is made by the vehicle or the connected vehicle network to not trust the source of the received data based on the source's providing of anomalous data, the unique identifier of the source may be added to the distributed ledger as a not-trusted source.

Figure 3:
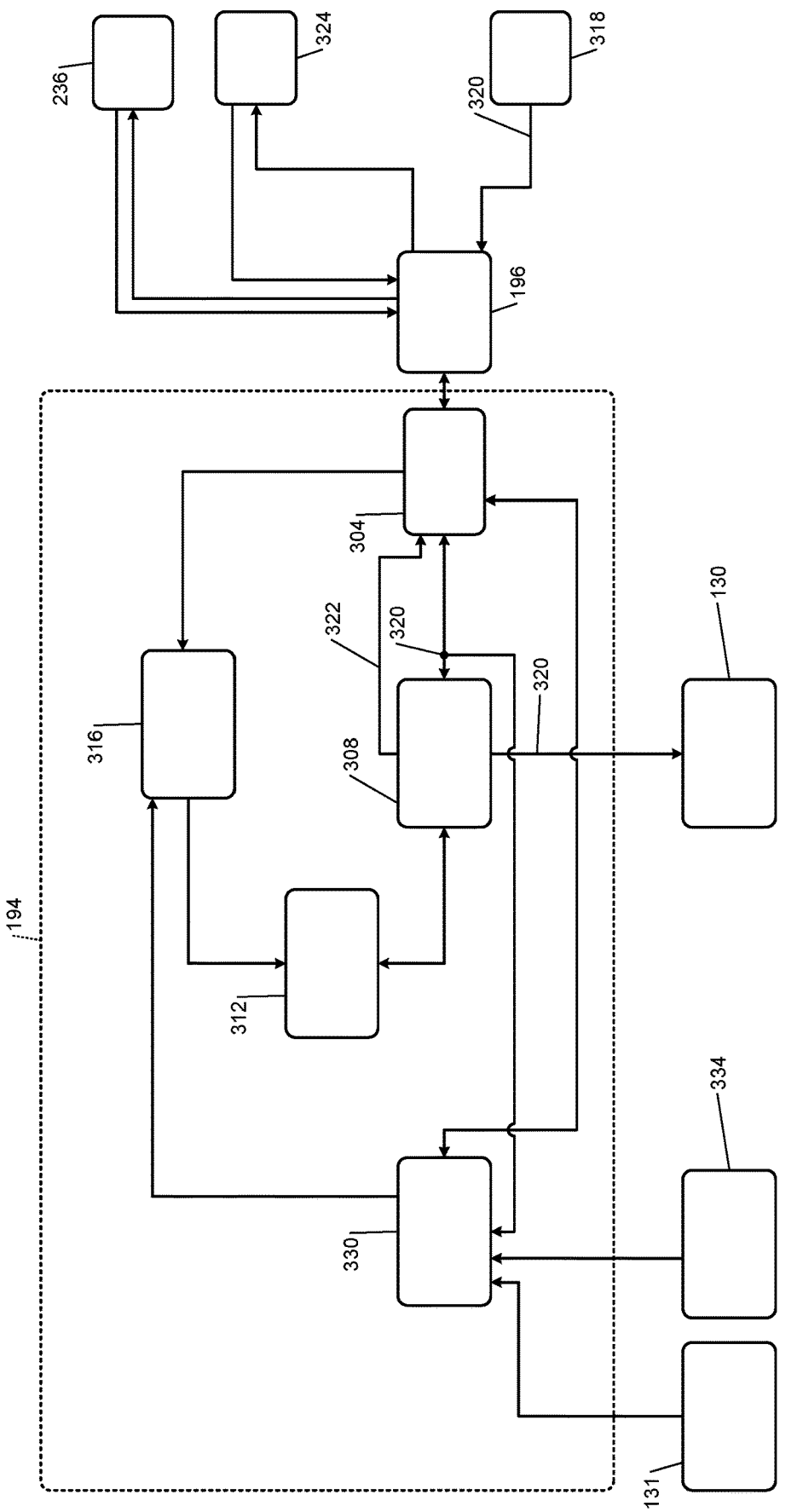
FIG. 3 includes a functional block diagram of an example implementation of a communication module.

FIG. 3 includes a functional block diagram of an example implementation of the communication module 194. The communication module 194 includes a transceiver 304, an ID comparison module 308, distributed ledger 312, and a ledger management module 316.

The transceiver 304 transmits and receives data wirelessly via the antennas 196. While the example of one transceiver is provided, the communication module 194 may include multiple transceivers.

The distributed ledger 312 may include a first portion including unique identifiers of trusted sources. The distributed ledger 312 may also include a second portion including unique identifiers of not trusted sources.

When broadcast data 320 is received from a source 318 (e.g., from vehicle or another type of node), the ID comparison module 308 obtains the unique identifier (ID) included in the broadcast data 320. The broadcast data 320 may also include other data, such as one or more of a type of the source 318 (e.g., truck, bus, car, utility vehicle, traffic signal or sign, building, etc.), a position (e.g., GPS position in latitude and longitude) of the source 318, a speed of the source 318, and a heading of the source 318.

The ID comparison module 308 determines whether the unique identifier included in the broadcast data 320 is included in the distributed ledger 312 as being trusted (e.g., in the first portion). If the unique identifier is trusted in the distributed ledger 312, the ID comparison module 308 may provide the broadcast data 320 to the DCM 130. The DCM 130 may actuate one or more vehicle actuators based on the broadcast data 320. For example, the DCM 130 may selectively accelerate or decelerate the vehicle 110 and/or steer the vehicle 110.

Additionally or alternatively, the ID comparison module 308 may transmit the broadcast data 320 to peers 324 (trusted vehicles and other types of nodes) and/or the server 236) of the connected vehicle network when the unique identifier is trusted in the distributed ledger 312. The peers 324 may perform one or more functions based on the broadcast data 320. For example, traffic signals may control timing of lights (e.g., to control traffic flow) based on the broadcast data 320. The server 236 or a group of vehicles may collectively control movement of the group of vehicles based on the broadcast data 320.

When the unique identifier is in the distributed ledger 312 as not being trusted, the communication module 194 may discard the broadcast data 320. In this way, the vehicle 110 does not use the broadcast data 320 and the broadcast data 320 is not disseminated to peers of the connected vehicle network. For example, the communication module 194 may add the broadcast data 320 to a message cue and delete messages from the message cue over time, such as at a predetermined rate.

When the unique identifier is not in the distributed ledger 312, the transceiver 304 transmits the unique identifier 322 of the broadcast data 320 to the peers 324 of the connected vehicle network. The transceiver 304 may also transmit a portion or all of the broadcast data 320 to the peers 324.

The peers 324 and the vehicle 110 determine whether to trust the source of the broadcast data 320 using a consensus algorithm. The consensus algorithm may be, for example, a proof of work consensus algorithm or another type of consensus algorithm.

If a determination is made to trust the source of the broadcast data 320, the vehicle 110 or a peer forms a new data block to add the unique identifier of the source of the broadcast data 320 as being trusted. A request is made for each trusted participant of the connected vehicle network to add the new data block to their respective distributed ledgers. Each vehicle and node updates its distributed ledger in response to the request. For example, the ledger management module 316 adds the unique identifier of the source of the broadcast data 320 to the distributed ledger (e.g., the first portion) as being trusted in response to the request.

If a determination is made to not trust the source of the broadcast data 320, the vehicle 110 or a peer forms a new data block to add the unique identifier of the source of the broadcast data 320 as being not trusted. A request is made for each trusted participant of the connected vehicle network to add the new data block to their respective distributed ledgers. Each vehicle and node updates its distributed ledger in response to the request. For example, the ledger management module 316 adds the unique identifier of the source of the broadcast data 320 to the distributed ledger (e.g., the second portion) as being not trusted in response to the request.

If the vehicle 110 and the other nodes cannot come to a consensus as to whether to trust or not trust the source of the broadcast data 320, the transceiver 304 may transmit the broadcast data 320 and the unique identifier to the server 236. The server 236 may determine whether to trust or not trust the source of the broadcast data 320.

For example, the server 236 may determine whether the source of the broadcast data 320 is included in a database of trusted sources. If the server 236 determines to trust the source, the server 236 may form a new data block to add the unique identifier of the source of the broadcast data 320 as being trusted. The server 236 makes a request for each trusted participant of the connected vehicle network to add the new data block to their respective distributed ledgers. Each vehicle and node updates its distributed ledger in response to the request. For example, the ledger management module 316 adds the unique identifier of the source of the broadcast data 320 to the distributed ledger (e.g., the first portion) as being trusted in response to the request.

If the server 236 determines to not trust the source, the server 236 may form a new data block to add the unique identifier of the source of the broadcast data 320 as being not trusted. The server 236 makes a request for each trusted participant of the connected vehicle network to add the new data block to their respective distributed ledgers. Each vehicle and node updates its distributed ledger in response to the request. For example, the ledger management module 316 adds the unique identifier of the source of the broadcast data 320 to the distributed ledger (e.g., the second portion) as being not trusted in response to the request.

Figure 4:
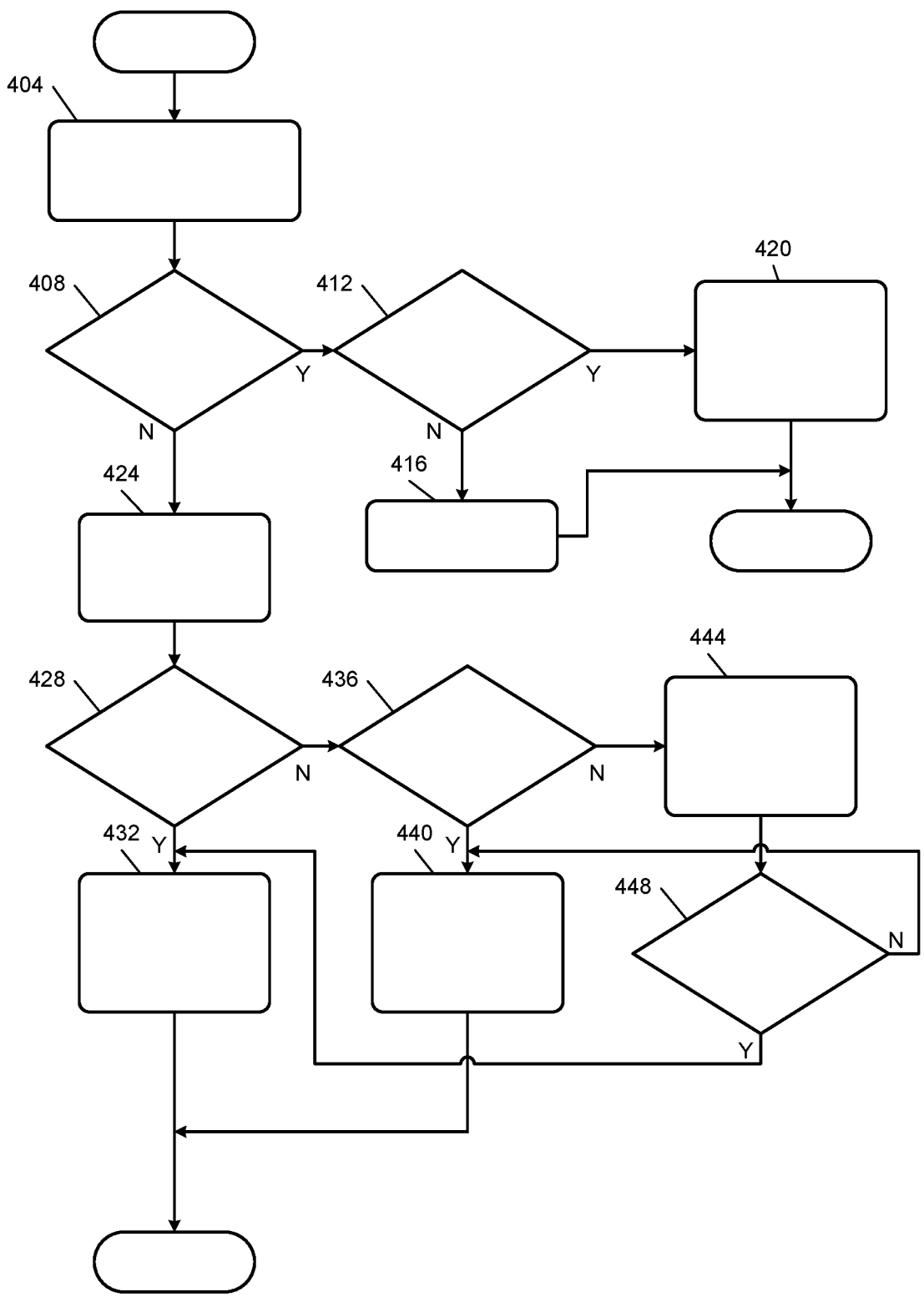
FIG. 4 includes a flowchart depicting an example method of determining whether to trust a source using a distributed ledger and managing the distributed ledger.

FIG. 4 is a flowchart depicting an example method of determining whether to trust a source using a distributed ledger and managing the distributed ledger. Control begins at 404 where the transceiver 304 of the vehicle 110 receives data from a source node. The data includes the unique identifier of the source and other data. At 408, the ID comparison module 308 compares the unique identifier of the source with the unique identifiers in the distributed ledger 312. The ID comparison module 308 determines whether the unique identifier of the source is listed in the distributed ledger 312 at 408. If 408 is true, control continues with 412. If 408 is false, control transfers to 424, which is discussed further below.

At 412, the ID comparison module 308 determines whether the unique identifier of the source is listed as trusted in the distributed ledger 312 (e.g., the first portion). If 412 is true, the ID comparison module 308 may transmit the received data to the DCM 130 for use by the vehicle and/or re-transmit or rebroadcast the received data to other nodes of the connected vehicle network at 420. If 412 is false, the communication module 194 discards the received data at 416 so that it is not used to control the vehicle 110 and is not re-transmitted or rebroadcast to other nodes of the connected vehicle network.

At 428 (when the unique identifier is not in the distributed ledger 312), the transceiver 304 may transmit the received data to the peers (nodes) 324 at 424. The vehicle 110 and the peers 324 individually execute the consensus algorithm and collectively determine whether to trust the source of the received data.

At 428, the vehicle 110 and the peers 324 determine whether the consensus is to trust the source of the received data. If 428 is true, a trusted node of the connected vehicle network (e.g., the vehicle 110 or one of the peers 324) requests that the unique identifier of the source be added as trusted at 428. The ledger management module 316 adds the unique identifier of the source to the distributed ledger 312 as trusted at 432, thereby adding another block to the blockchain of the distributed ledger 312. The other nodes of the connected vehicle network also add the unique identifier to their respective distributed ledgers as being trusted. If 428 is false, control transfers to 436.

At 436, the vehicle 110 and the peers 324 determine whether the consensus is to not trust the source of the received data. If 436 is true, a trusted node of the connected vehicle network (e.g., the vehicle 110 or one of the peers 324) requests that the unique identifier of the source be added as not trusted at 440. The ledger management module 316 adds the unique identifier of the source to the distributed ledger 312 as being not trusted at 440, thereby adding another block to the blockchain of the distributed ledger 312. The other nodes of the connected vehicle network also add the unique identifier to their respective distributed ledgers as being not trusted. If 436 is false, control may transfer to 444.

At 444, the vehicle 110 or one of the peers 324 may transmit the received data to the server 236. At 448, the server 236 may determine whether the unique identifier of the source is included within a database of unique identifiers of trusted sources. If 448 is true, control may transfer to 432 and add the unique identifier of the source to the distributed ledgers as trusted. If 448 is false, control may transfer to 440 to add the unique identifier of the source to the distributed ledgers as not trusted. While the example of FIG. 4 is shown as ending, FIG. 4 may be performed, for example, each time data is received from a source.

Referring back to FIG. 3, the communication module 194 may also include an anomaly module 330. The anomaly module 330 determines whether the broadcast data 320 includes an anomaly based on the broadcast data 320 and data from devices of the vehicle 110, such as the location of the vehicle 110 provided by the GPS module 131 and data from cameras and sensors 334 of the vehicle 110.

The cameras and sensors 334 may include, for example, the forward facing camera 184, the side facing cameras 186 and 187, the rear facing camera 188 and other cameras of the vehicle 110 that identify objects located around the vehicle 110. The cameras and sensors 334 may also include LIDAR sensors of the vehicle, radar sensors of the vehicle, sonar sensors of the vehicle, and/or other types of sensors that identify objects located around the vehicle 110. For example, the cameras and sensors 334 may identify, based on captured data, locations of objects (e.g., vehicles and other types of nodes) around the vehicle, types of objects located around the vehicle, speed of objects located around the vehicle, and other parameters.

The anomaly module 330 may determine that the broadcast data 320 includes an anomaly when the cameras and sensors 334 indicate that no vehicle is present within FOVs of the cameras and sensors 334 yet the broadcast data 320 indicates that the source of the broadcast data 320 is a vehicle that is located within one or more FOVs of one or more of the cameras and sensors 334. As another example, the anomaly module 330 may determine that the broadcast data 320 includes an anomaly when the cameras and sensors 334 indicate that a bus is present at a location in front of the vehicle yet the broadcast data 320 indicates that the source of the broadcast data 320 is a car (or another type of object) at or near the location.

As another example, the anomaly module 330 may determine that the broadcast data 320 includes an anomaly when the broadcast data 320 indicates that a vehicle having a heading is present at a location and the cameras and sensors 334 indicate that a vehicle having a different heading is present at the location. As another example, the anomaly module 330 may determine that the broadcast data 320 includes an anomaly when the broadcast data 320 indicates that an object at a location is traveling at a speed and the cameras and sensors 334 indicate that an object having a different speed is present at the location. Generally stated, the anomaly module 330 may determine that the broadcast data 320 includes an anomaly when the broadcast data 320 indicates that the source has a characteristic and the cameras and sensors 334 indicate no source having that characteristic is present.

In various implementations, the anomaly module 330 may store the unique identifier of the source of the broadcast data 320 in the distributed ledger 312 (e.g., in a third portion) or another distributed ledger as including an anomaly (e.g., providing anomalous data) when the broadcast data 320 is determined to include an anomaly. In various implementations, in addition to or as an alternative to indicating the source as including an anomaly, the anomaly module 330 may store the unique identifier of the source of the broadcast data 320 in the distributed ledger 312 (e.g., in the second portion) as being not trusted.

In response to the anomaly module 330 determining that the broadcast data 320 includes an anomaly, the transceiver 304 may broadcast the broadcast data 320 to the peers 324. The transceiver 304 may also broadcast the other data to the peers 324. The peers 324 and the vehicle 110 may determine whether the source of the broadcast data 320 includes an anomaly using a consensus algorithm. The consensus algorithm may be, for example, a proof of work consensus algorithm or another type of consensus algorithm.

If a determination is made that the source of the broadcast data 320 includes an anomaly, the vehicle 110 or a peer forms a new data block to add the unique identifier of the source of the broadcast data 320 as including an anomaly (or as not trusted). A request is made for each trusted participant of the connected vehicle network to add the new data block to their respective distributed ledgers. Each vehicle and node updates its distributed ledger in response to the request. For example, the ledger management module 316 adds the unique identifier of the source of the broadcast data 320 to the distributed ledger 312 (e.g., the second portion or third portion) or another distributed ledger in response to the request.

Figure 5:
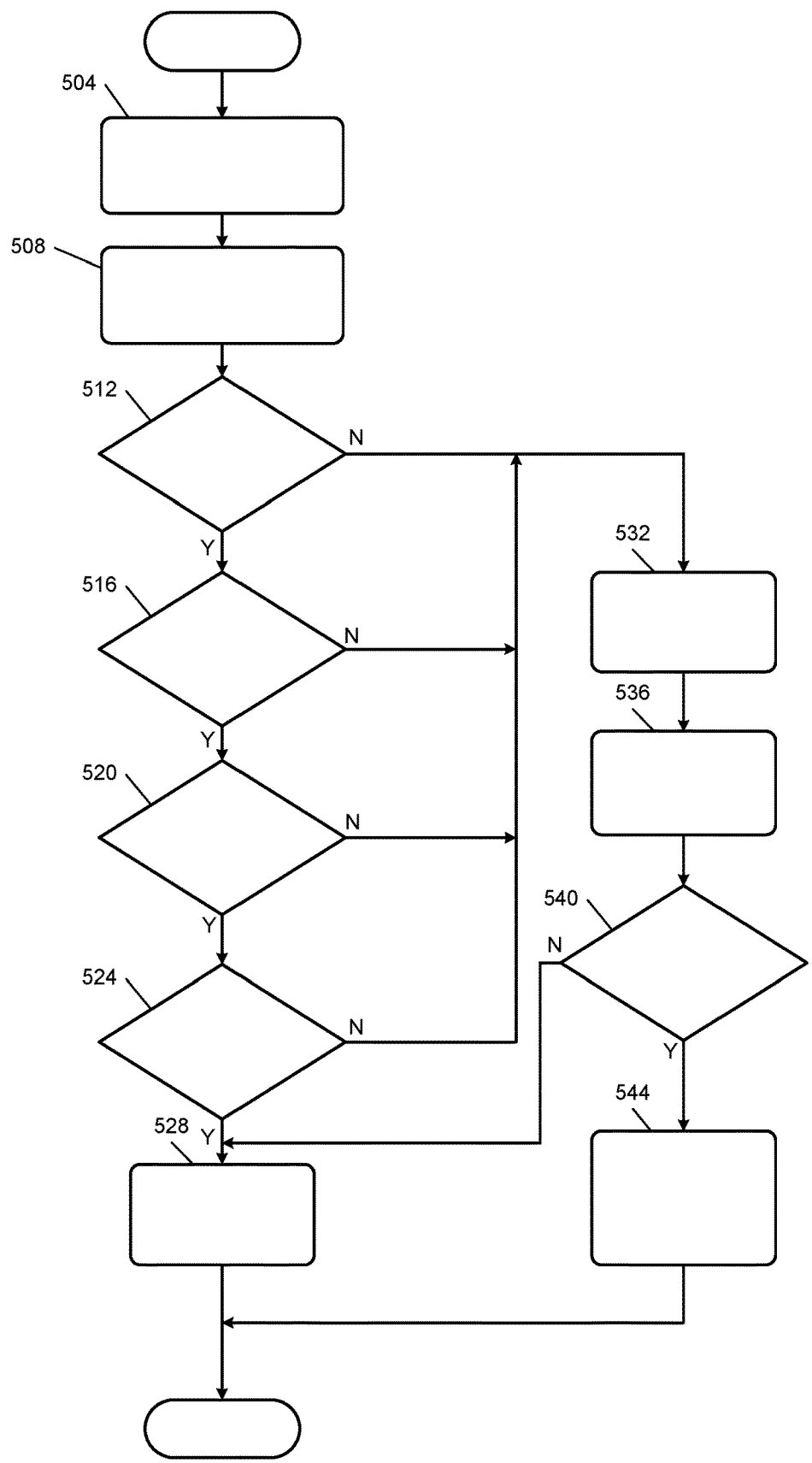
FIG. 5 includes a flowchart depicting an example method of identifying an anomaly and managing the distributed ledger.

FIG. 5 includes a flowchart depicting an example method of identifying an anomaly and managing a distributed ledger. Control may begin with 504 where the transceiver 304 of the vehicle 110 receives data from a source node. The data includes the unique identifier of the source and other data, such as a location of the source, a speed of the source, a heading of the source, a type of the source, and other data.

At 508, the anomaly module 330 receives data from the cameras and sensors 334, such as locations of identified objects located around the vehicle 110, types of objects located around the vehicle 110, speeds of objects located around the vehicle 110, and headings of objects located around the vehicle 110.

At 512, the anomaly module 330 may determine whether the data from the cameras and sensors 334 indicates that an object is present approximately at the location included in the received data from the source. In this case, approximately may mean, for example, within a predetermined distance. The cameras and sensors 334 or the anomaly module 330 may determine the location of the object, for example, based on the GPS location of the vehicle and the location of the object identified by the cameras and sensors 334. If 512 is true, control may continue with 516. If 512 is false, control may transfer to 532, which is discussed further below.

At 516, the anomaly module 330 may determine whether the data from the cameras and sensors 334 indicates that the type of the object that is approximately at the location is the same as the type included in the received data from the source. If 516 is true, control may continue with 520. If 516 is false, control may transfer to 532.

At 520, the anomaly module 330 may determine whether the data from the cameras and sensors 334 indicates that the heading of the object that is approximately at the location is approximately the same as the heading included in the received data from the source. In this case, approximately may mean having at least one common heading direction (e.g., East, West, etc.). If 520 is true, control may continue with 524. If 520 is false, control may transfer to 532.

At 524, the anomaly module 330 may determine whether the data from the cameras and sensors 334 indicates that the speed of the object that is approximately at the location is approximately the same as the speed included in the received data from the source. In this case, approximately may mean, for example, within a predetermined speed or percentage. If 524 is true, the anomaly module 330 may indicate that the source does not include an anomaly at 528. If 524 is false, control may transfer to 532.

At 532 (when the data from the source does not match or approximately match the data from the cameras and sensors 334 in at least one respect), the anomaly module 330 may indicate that the source of the data includes an anomaly. The transceiver 304 may transmit the received data to the peers (nodes) 324 at 536.

At 540, the vehicle 110 and the peers 324 may collectively determine whether the source of the received data includes an anomaly. If 540 is false, control may transfer to 528 and the unique identifier of the source may not be added to the distributed ledgers of the nodes of the connected vehicle network. If 540 is true, the ledger management module 316 may include the unique identifier of the source as including an anomaly within the distributed ledger 312 at 544. The peers 324 may also update their distributed ledgers to include the unique identifier of the source as including an anomaly. While the example of FIG. 5 is shown as ending, FIG. 5 may be performed, for example, each time data is received from a source.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A distributed ledger system of a vehicle, comprising:
at least one transceiver configured to wirelessly receive data from a source node that is external to the vehicle, the data including a unique identifier (ID) of the source node and at least one of:
   a first location of the source node;
   a first heading of the source node;
   a first speed of the source node; and
   a first object type of the source node;
at least one of a camera and a sensor configured to identify objects located around the vehicle;
an anomaly module configured to selectively indicate that an anomaly is present in the data received from the source node based on at least one of:
   a comparison of the first location of the source node with input from the at least one of the camera and the sensor;
   a comparison of the first heading of the source node with input from the at least one of the camera and the sensor;
   a comparison of the first speed of the source node with input from the at least one of the camera and the sensor; and
   a comparison of the first object type of the source node with input from the at least one of the camera and the sensor;
a distributed ledger including a first list of unique IDs associated with trusted source nodes and a second list of unique IDs associated with not-trusted source nodes; and
a ledger management module configured to, in response to an indication that an anomaly is present in the data received from the source node, add the unique ID of the source node to the second list of unique IDs associated with not trusted source nodes stored in the distributed ledger,
wherein:
   the data received from the source node includes the first location of the source node; and
   the anomaly module is configured to indicate that an anomaly is present in the data received from the source node when the at least one of the camera and the sensor do not identify the presence of an object within a predetermined distance of the first location of the source node.

2. The distributed ledger system of claim 1 wherein:
the data received from the source node further includes the first heading of the source node; and
the anomaly module is configured to indicate that an anomaly is present in the data received from the source node when the at least one of the camera and the sensor identify:
   an object at approximately the first location; and
   the object has a second heading that is different than the first heading of the source node.

3. The distributed ledger system of claim 1 wherein:
the data received from the source node further includes the first speed of the source node; and
the anomaly module is configured to indicate that an anomaly is present in the data received from the source node when the at least one of the camera and the sensor identify:
   an object at approximately the first location; and
   the object has a second speed that is different than the first speed of the source node.

4. The distributed ledger system of claim 1 wherein:
the data received from the source node further includes the first object type of the source node; and
the anomaly module is configured to indicate that an anomaly is present in the data received from the source node when the at least one of the camera and the sensor identify:
an object at approximately the first location; and
the object is a second type of object that is different than the first object type of the source node.

5. The distributed ledger system of claim 1 wherein:
the at least one of the camera and the sensor include:
at least one camera having a field of view outside of the vehicle; and
at least one light detection and ranging (LIDAR) sensor.

6. The distributed ledger system of claim 1 wherein:
the at least one transceiver is configured to, in response to an indication of an anomaly in the data received from the source node, wirelessly transmit the data received from the source node to the trusted source nodes of a connected vehicle network for execution of a consensus algorithm; and
the ledger management module is configured to, in response to a determination that the data received from the source node includes an anomaly via execution of the consensus algorithm, add the unique ID of the source node to the second list of unique IDs associated with not trusted source nodes stored in the distributed ledger.

7. The distributed ledger system of claim 1 further comprising a driving control module configured to, in response to a determination that the unique ID of the source node is in the second list of unique IDs associated with not-trusted source nodes, control movement of the vehicle independently of the data from the source node.

8. The distributed ledger system of claim 1 further comprising a driving control module configured to, in response to a determination that the unique ID of the source node is within the first list of unique IDs associated with trusted source nodes stored in the distributed ledger, selectively adjust steering of the vehicle based on the data received from the source node.

9. The distributed ledger system of claim 1 further comprising a driving control module configured to, in response to a determination that the unique ID of the source node is within the first list of unique IDs associated with trusted source nodes stored in the distributed ledger, selectively decelerate the vehicle based on the data received from the source node.

10. The distributed ledger system of claim 1 further comprising a driving control module configured to, in response to a determination that the unique ID of the source node is within the first list of unique IDs associated with trusted source nodes stored in the distributed ledger, selectively accelerate the vehicle based on the data received from the source node.

11. The distributed ledger system of claim 1 further comprising a driving control module configured to, in response to a determination that the unique ID of the source node is within the first list of unique IDs associated with trusted source nodes stored in the distributed ledger, selectively apply brakes of the vehicle based on the data received from the source node.

12. The distributed ledger system of claim 1 further comprising a driving control module configured to, in response to a determination that the unique ID of the source node is within the first list of unique IDs associated with trusted source nodes stored in the distributed ledger, selectively one of increase and decrease torque output of an internal combustion engine the vehicle based on the data received from the source node.

13. The distributed ledger system of claim 1 further comprising a driving control module configured to, in response to a determination that the unique ID of the source node is within the first list of unique IDs associated with trusted source nodes stored in the distributed ledger, selectively one of increase and decrease torque output of an electric motor of the vehicle based on the data received from the source node.

14. The distributed ledger system of claim 1 wherein the source node is one of:
a second vehicle;
an infrastructure node; and
a traffic system node.

15. The distributed ledger system of claim 1 wherein the at least one transceiver is configured to, in response to a determination to that the unique ID of the source node is within the second list of unique IDs associated with not-trusted source nodes, discard the data received from the source node.

16. A system comprising:
a distributed ledger system of a vehicle, comprising:
at least one transceiver configured to wirelessly receive data from a source node that is external to the vehicle, the data including a unique identifier (ID) of the source node and at least one of:
a first location of the source node;
a first heading of the source node;
a first speed of the source node; and
a first object type of the source node;
at least one of a camera and a sensor configured to identify objects located around the vehicle;
an anomaly module configured to selectively indicate that an anomaly is present in the data received from the source node based on at least one of:
a comparison of the first location of the source node with input from the at least one of the camera and the sensor;
a comparison of the first heading of the source node with input from the at least one of the camera and the sensor;
a comparison of the first speed of the source node with input from the at least one of the camera and the sensor; and
a comparison of the first object type of the source node with input from the at least one of the camera and the sensor;
a distributed ledger including a first list of unique IDs associated with trusted source nodes and a second list of unique IDs associated with not-trusted source nodes; and
a ledger management module configured to, in response to an indication that an anomaly is present in the data received from the source node, add the unique ID of the source node to the second list of unique IDs associated with not trusted source nodes stored in the distributed ledger; and
a second vehicle comprising:
a second distributed ledger including a third list of unique IDs associated with trusted source nodes and a fourth list of unique IDs associated with not-trusted source nodes; and a second ledger management module configured to, in response to an indication that an anomaly is present in the data received from the source node, add the unique ID of the source node to the fourth list of unique IDs associated with not trusted source nodes stored in the second distributed ledger.

17. A method for a vehicle, comprising:
by at least one transceiver, wirelessly receiving data from a source node that is external to the vehicle, the data including a unique identifier (ID) of the source node and at least one of:
 a first location of the source node;
 a first heading of the source node;
 a first speed of the source node; and
 a first object type of the source node;
by at least one of a camera and a sensor, identifying objects located around the vehicle;
selectively indicating that an anomaly is present in the data received from the source node based on at least one of:
 a comparison of the first location of the source node with input from the at least one of the camera and the sensor;
 a comparison of the first heading of the source node with input from the at least one of the camera and the sensor;
 a comparison of the first speed of the source node with input from the at least one of the camera and the sensor; and
 a comparison of the first object type of the source node with input from the at least one of the camera and the sensor;
managing a distributed ledger including a first list of unique IDs associated with trusted source nodes and a second list of unique IDs associated with not-trusted source nodes; and
in response to an indication that an anomaly is present in the data received from the source node, adding the unique ID of the source node to the second list of unique IDs associated with not trusted source nodes stored in the distributed ledger,
wherein:
 the data received from the source node includes the first location of the source node; and
 selectively indicating that an anomaly is present includes indicating that an anomaly is resent in the data received from the source node when the at least one of the camera and the sensor do not identify the presence of an object within a predetermined distance of the first location of the source node.

18. The method of claim 17 further comprising:
in response to an indication of an anomaly in the data received from the source node, wirelessly transmitting the data received from the source node to the trusted source nodes of a connected vehicle network for execution of a consensus algorithm; and
in response to a determination that the data received from the source node includes an anomaly via execution of the consensus algorithm, adding the unique ID of the source node to the second list of unique IDs associated with not trusted source nodes stored in the distributed ledger.

* * * * *